United States Patent [19]
Falk et al.

[11] Patent Number: 4,719,093
[45] Date of Patent: Jan. 12, 1988

[54] PROCESS FOR THE CLEAVAGE OF CHLOROSILOXANES

[75] Inventors: Bernhard Falk, Rheinfelden-Minseln; Klaus Ruff, Troisdorf; Klaus Schrage, Königswinter, all of Fed. Rep. of Germany

[73] Assignee: Dynamit Nobel AG, Cologne, Fed. Rep. of Germany

[21] Appl. No.: 43,155

[22] Filed: Apr. 27, 1987

[30] Foreign Application Priority Data

May 7, 1986 [DE] Fed. Rep. of Germany ....... 3615509

[51] Int. Cl.$^4$ .................. C01B 33/08; C01B 33/12
[52] U.S. Cl. .................................. 423/335; 423/325; 423/341; 423/342
[58] Field of Search ............... 423/342, 335, 341, 325, 423/336, 337

[56] References Cited
U.S. PATENT DOCUMENTS 4,585,646  4/1986  Gomberg ........................... 423/342

OTHER PUBLICATIONS

Chemical Abstracts, vol. 95, No. 15, 10/12/81, 132524v, Cleavage of Siloxanes, Koetzsch et al.
Chemical Abstracts, vol. 83, No. 12, 9/22/75, 107756s, Composition of High Boiling Fractions from Direct Synthesis of Trichlorosilane, Lerny et al.
Chemical Abstracts, vol. 89, No. 5, 7/31/78, 43752b, Conversion of Organosiloxanes, Frey et al.

Primary Examiner—Gregory A. Heller
Assistant Examiner—Lori S. Freeman
Attorney, Agent, or Firm—Felfe & Lynch

[57] ABSTRACT

Disclosed is a process for the cleavage of chlorosiloxanes in the gas phase at temperatures between 350 and 1450° C. to form chlorosilanes and silicon dioxide as reaction products. The claimed process is preferably performed in the presence of metallic silicon or ferrosilicon. The procedure can be combined with the large-scale technical production of chlorosilanes by the chlorination or hydrochlorination of silicon. The inventive process makes it possible to perform the chlorination or hydrochlorination of silicon with the formation of chlorosilanes in an increased yield while reducing the formation of by-products.

17 Claims, No Drawings

PROCESS FOR THE CLEAVAGE OF CHLOROSILOXANES

BACKGROUND OF THE INVENTION

The subject matter of the present invention is a process for the cleavage of chlorosiloxanes at elevated temperature, in which silicon tetrachloride forms as the cleavage product, and, in some case, trichlorosilane. The chlorosiloxanes to be cleaved occur mainly as by-products in the production of tri- and tetrachlorosilane, so that the claimed process contributes toward increasing the yield of chlorosilanes in the production of chlorosilanes, and toward reducing, or completely eliminating, the amount of by-products.

In the large-scale technical production of silicon tetrachloride in reactors by the reaction of lump silicon or siliceous material, such as ferrosilicon for example, hexachlorodisiloxane, among other substances, occurs as by-product. If the reaction is performed with hydrogen chloride, a chlorosiloxane mixture is obtained which consists mainly of hexachlorodisiloxane and pentachlorodisiloxane.

These chlorodisiloxanes are formed by the reaction of chlorosilanes with water, which enters the production process as moisture with moist raw materials such as chlorine, hydrogen chloride, or metallic silicon or, in discontinuous processes, gains entry into the production apparatus with humid air when the reactor is charged and the ash is cleaned out.

Other by-products in the reaction of siliceous material with chlorine or hydrogen chloride are metal chlorides and ash. The metal chlorides are formed by the reaction of metals contained in the raw silicon. The content of foreign metals in the raw silicon usually amounts to 2 to 10 wt.-%; iron and aluminum are the principal such metals.

Usually the silicon tetrachloride and/or trichlorosilane main product is separated from the above by-products by distillation. This results in a mixture of chlorodisiloxanes, metal chlorides and ash, which must be disposed of along with a small amount of silicon tetrachloride.

It is known to dispose of the by-products by hydrolyzing all of them, the disiloxanes being converted to silicic acid and the metal chlorides to metal oxides or oxide hydrates, and hydrogen chloride is released, in the form of hydrochloric acid in some cases. The disadvantage of this procedure consists on the one hand in a loss of raw material, i.e., a reduced yield of the overall process, and on the other hand in the fact that a silica solution containing hydrochloric acid is produced, which again must be disposed of.

It is furthermore also known that hexachlorodisiloxane can be cleaved to silicon tetrachloride and octachlorotrisiloxane at temperatures between 70° and 137° C. (C.A. Vol. 94, page 692, 40670 r). The technical practice of this procedure faces the obstacle that only a small part of the silicon reacts to produce a salable product, while most of the silicon is converted to a product which cannot be sold and presents the same disposal problems.

The problem was therefore to find a method of cleaving chlorosiloxanes such that largely salable end products will be formed, which present no additional disposable problems and most of which can be utilized economically.

SUMMARY OF THE INVENTION

As the solution to this problem, a process has now been found for the thermal cleavage of chlorosiloxanes to form chlorosilanes. In the process of the invention, the cleavage is performed in the gas phase at temperatures beween 350° and 1450° C., with the simultaneous formation of silicon dioxide.

In the performance of this process, only chlorosilanes and silicon dioxide are formed as reaction products, so that more than 88% of the reacted chlorosiloxanes are converted to a salable end product. If hexachlorodisiloxane alone is used as the chlorosiloxane, silicon tetrachloride forms as the chlorosilane; if pentachlorodisiloxane is used as the starting product, a mixture of trichlorosilane and tetrachlorosilane is obtakined, which can be separated into its components in a known manner.

The cleavage rate depends on, among other things, the temperature and residence time. Even at temperatures around 350° C. a cleavage occurs which can be technically exploited, especially if the process conditions stated below as preferred are selected. As the temperature is increased and cleavage rate for the same residence time increases. Especially good cleavage rates are achieved in the temperature range between 600 and 1200° C.

The residence time can generally be varied between 0.3 and 30 seconds, optionally between 0.5 and 0 seconds. The optimum residence time will depend on the other process conditions.

It has furthermore been found that the cleavage rate is increased by the presence of metallic silicon. Also to be considered as metallic silicon starting material are alloyws or intermetallic compounds of silicon with, e.g., iron, carbon, phosphorus or nitrogen, in which the silicon content is greater than 50%, as in the case of ferrosilicon, silicon carbide or silicon nitride for example. The silicon can be in lump form or in powder form.

Cleavage in the presence of silicon also makes it possible to perform the process according to the invention in a fluidized bed reactor. The fluidizing gas can also be hydrogen chloride, which in that case can simultaneously serve as a reactant for the production of chlorosilanes. The velocity of the fluidizing gases through the fluidized bed is not limited and may vary between 0.01 and 2 m/s. In this manner it is possible to couple the production of chlorosilanes with the process according to the invention, possibly with a partial recirculation of the reaction produces that form. In this case the chlorosiloxanes that form in the production of chlorosilane can be separated from the solid reaction products by distillation and then fed to the chlorosilane reactor in which the cleavage according to the invention then takes place, in which silicon dioxide alone occurs as a solid product, which is separated in a manner known in itself, along with other solids that are produced.

The process according to the invention can also be combined with a chlorosilane production in which metallic silicon is reacted with chlorine. This variant of the process can be performed similarly to the described embodiment in which silicon is hydrochlorinated.

The term "chlorosiloxanes" as used in connection with the invention is to be understood to mean the chlorosiloxanes produced in the technical chlorination or hydrochlorination of silicon. They are chiefly penta- and hexachlorodisiloxane. Since in this reaction, however, more highly condensed chlorosiloxanes occur, such as for example the above-names octachlorotrisiloxane, the term "chlorosiloxanes" is to be understood also to include these more highly condensed chlorosiloxanes having three or four silicon atoms.

The silica produced in the cleavage according to the invention can be separated from the other reaction products in a manner known in itself; it can also be used as a filler material, if the reaction is suitably conducted.

EXAMPLES

Example 1

Hexachlorodisiloxane is passed through an electrically heated quartz tube with nitrogen as carrier gas. The hexachlorodisiloxane reacted to form silicon dioxide and silicon tetrachloride. At 800° C. and 10 seconds residence time the transformation amounted to 18% of the hexachlorodisiloxane. At a temperature of 900° C. and 8 seconds detention time a transformation of 33% was obtained.

Example 2

In the quartz tube described in Example 1, a cylindrical insert vessel of quartz with a frit bottom was suspended. The insert was filled with crushed silicon metal, grain size 3 to 5 mm. Nitrogen, charged with hexachlorodisiloxane, was passed through the solid bed from underneath. At 650° C. and 10 seconds residence time a transformation of 14% was reached. When the temperature was raised to 800° C. with 5 seconds residence time a transformation of 98% was measured. The residence time was calculated on the basis of the void space volume of the filling.

Example 3

Silicon metal dust, grain size 0.05 to 0.7 mm, was placed in the quartz insert of Example 2. Hydrogen chloride, nitrogen and hexachlorodisiloxane were passed with a velocity of 7 cm/s through the frit from below, so that a fluid bed with a bubble phase of 10 vol% was produced. At a residence time of the gas in the fluid bed of 1 second and a temperature of 500° C. a transformation of 17% was obtained. At 650° C. and 1 second residence time the transformation increased to 85%. The residence time was calculated on the basis of the bubble phase of the fluid bed.

It will be understood that the specification and examples are illustrated but not limitative of the present invention and that other embodiments within the spirit and scope of the invention will suggest themselves to those skilled in the art:

We claim:

1. A process for the cleavage of chlorosiloxanes comprising: subjecting the chlorosiloxane in the gas phase to a temperature of from 350° to 1450° C. to form chlorosilane and $SiO_2$.

2. The process of claim 1 wherein the cleavage is performed in the presence of metallic silicon.

3. The process of claim 2 wherein the metallic silicon is in a lump or powder form.

4. The process of claim 2 wherein the metallic silicon is a silicon containing alloy.

5. The process of claim 2 wherein the metallic silicon is an intermetallic compound of silicon with a substance selected from the group consisting of iron, carbon, phosphorus or nitrogen.

6. The process of claim 5 wherein the silicon content of the intermetallic compound is at least 50 wt.-%.

7. The process of claim 1 wherein the cleavage is performed in a fluid bed.

8. The process of claim 7 wherein at least a portion of the cleavage products are recirculated to the fluid bed.

9. The process of claim 7 wherein a fluidizing gas is introduced into the fluid bed and contains HCl.

10. The process of claim 1 wherein the cleavage is performed in the presence of hydrogen chloride or chlorine.

11. The process of claim 1 wherein the chlorosiloxanes formed in the production of trichlorosilane and tetrachlorosilane are used as the chlorosiloxanes.

12. The process of claim 1 wherein the chlorosiloxane is hexachlorodisiloxane.

13. The process of claim 1 wherein the chlorosiloxane is pentachlorodisiloxane.

14. The process of claim 1 wherein the cleavage products include $SiCl_4$.

15. The process of claim 1 wherein the temperature is from 600° to 1200° C.

16. The process of claim 1 wherein the chlorosiloxane is subjected to the temperature for a period of from 0.3 to 30 seconds.

17. The process of claim 1 wherein the metallic silicon is a ferrosilicon.

* * * * *